United States Patent
Pratten et al.

(10) Patent No.: US 10,607,455 B1
(45) Date of Patent: Mar. 31, 2020

(54) AUTOMATED TELLER MACHINE PROVIDING WITHDRAWALS WITH A SINGLE AUTHENTICATION FACTOR

(71) Applicant: The Toronto-Dominion Bank, Toronto (CA)

(72) Inventors: A Warren Pratten, Toronto (CA); Anthony Wayne Miles, Toronto (CA); Vikram Malhotra, Toronto (CA); Ratnadeep Bhadra, Toronto (CA); James Kenneth McCrae, Toronto (CA); Vincent Fazio, Middletown, DE (US)

(73) Assignee: The Toronto-Dominion Bank, Toronto, Ontario (CA)

( * ) Notice: Subject to any disclaimer, the term of this patent is extended or adjusted under 35 U.S.C. 154(b) by 0 days.

(21) Appl. No.: 16/274,617

(22) Filed: Feb. 13, 2019

(51) Int. Cl.
*G06Q 40/00* (2012.01)
*G07F 19/00* (2006.01)
*G06Q 20/40* (2012.01)
*H04W 4/30* (2018.01)

(52) U.S. Cl.
CPC ....... *G07F 19/211* (2013.01); *G06Q 20/4012* (2013.01); *G07F 19/203* (2013.01); *G07F 19/206* (2013.01); *H04W 4/30* (2018.02)

(58) Field of Classification Search
USPC .......................................... 235/379; 705/43
See application file for complete search history.

(56) References Cited

U.S. PATENT DOCUMENTS

| | | | |
|---|---|---|---|
| 2008/0154727 A1 | 6/2008 | Carlson | |
| 2013/0226799 A1 | 8/2013 | Raj | |
| 2015/0254655 A1 | 9/2015 | Bondessen et al. | |
| 2016/0098904 A1* | 4/2016 | Choudhury | G07F 19/203 705/43 |
| 2018/0165663 A1 | 6/2018 | Naik et al. | |
| 2018/0285843 A1 | 10/2018 | Chaturvedi | |
| 2018/0300991 A1 | 10/2018 | Park | |

\* cited by examiner

*Primary Examiner* — Jamara A Franklin
(74) *Attorney, Agent, or Firm* — Rowand LLP; Neil L. Padgett

(57) ABSTRACT

An automated teller machine includes a processor, a wireless communications module, a cash dispenser, and a memory. The memory stores instructions that, when executed by the processor, cause the automated teller machine to detect, using the wireless communications module, that an authentication token capable of wireless communication has been brought into communications range of the module and communicate with the authentication token to cryptographically authenticate the token and to receive information identifying an account associated with the token. Then, without receiving user-input providing a second authentication factor the automated teller machine initiates processing of a withdrawal of a specified quantity of cash from the account. The processing of the withdrawal includes determining, based on an automated assessment of compliance with one or more policies, that the withdrawal is executable without further authentication. The automated teller machine then dispenses, using the cash dispenser, the specified quantity of cash.

20 Claims, 10 Drawing Sheets

AUTOMATED TELLER MACHINE PROVIDING WITHDRAWALS WITH A SINGLE AUTHENTICATION FACTOR

FIELD

This relates to automated teller machines (ATMs) and, more particularly, to automated teller machines supporting withdrawals authorized based on a single authentication factor such as, for example, provision of a contactless card.

BACKGROUND

Automated teller machines (ATMs) (also known as automated banking machines (ABMs)) allow customers of financial institutions to perform operations like making withdrawals and deposits without requiring the use of a human teller. In order to provide security for customer financial accounts, customers must authenticate to the ATM.

Conventional ATM authentication is two-factor: a customer must provide an ATM card and must also key a personal identification number (PIN). The ATM card is typically an ISO-sized card, usually made of plastic, with a magnetic stripe and/or a smart chip encoding identifying information. The PIN is a short sequence of digits such as, for example, a four-digit code. A user of an ATM must authenticate by providing the ATM card and PIN before the ATM will allow them to perform any transactions, including withdrawals.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1A:
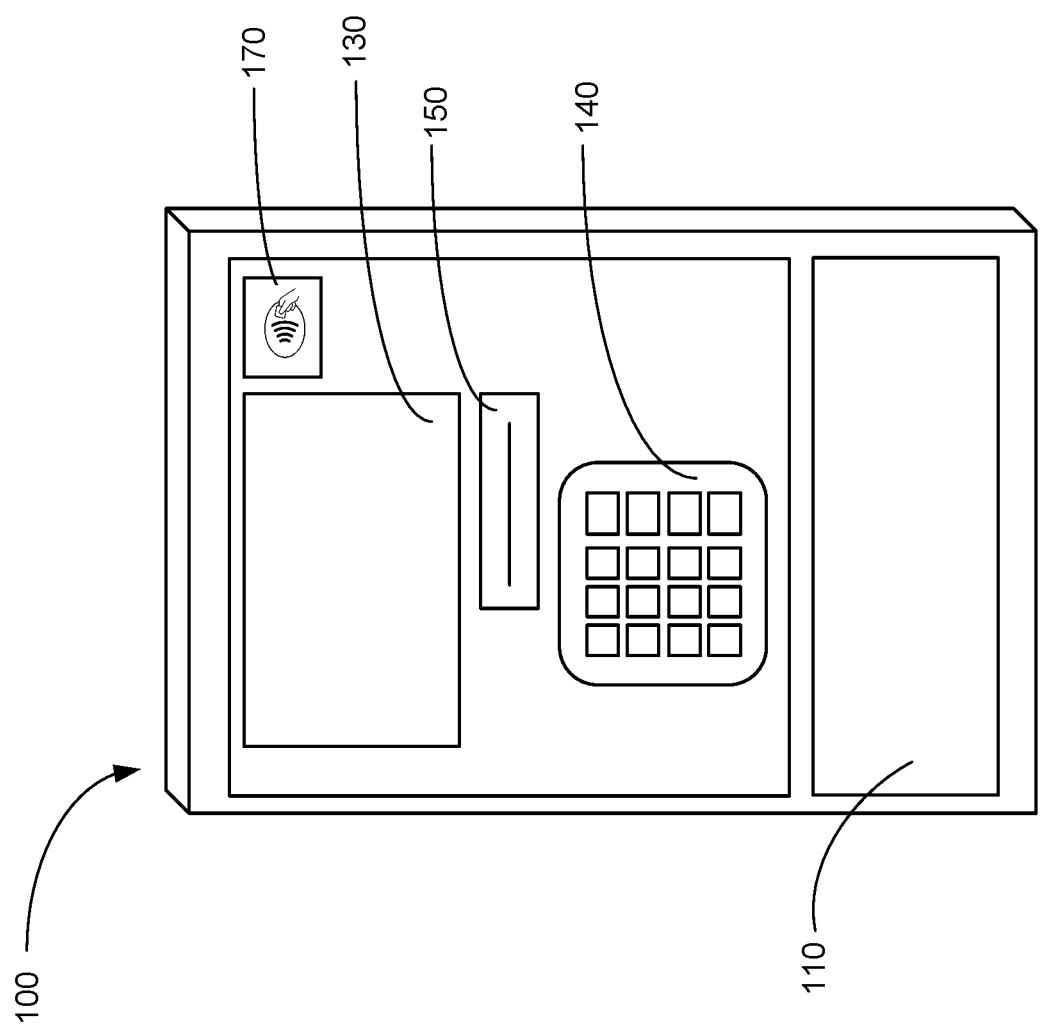
FIGS. 1A and 1B are simplified diagrams showing components of an automated teller machine according to the subject matter of the present application with an access panel of the automated teller machine closed and opened, respectively.

According to the subject matter of the present application, there may be provided an automated teller machine including a processor, a wireless communications module, a value instrument dispenser and a memory. The wireless communications module, the value instrument dispenser and the memory are coupled to the processor. The memory may store instructions that, when executed by the processor, cause the automated teller machine to detect, using the wireless communications module, that an authentication token capable of wireless communication has been brought into communications range of the wireless communications module. The instructions, when executed, may further cause the processor to communicate with the authentication token using the wireless communication module to cryptographically authenticate the token and to receive information identifying an account associated with the token. The instructions, when executed, may further cause the processor to, without receiving user-input providing a second authentication factor, initiate processing of a withdrawal of a specified quantity of value instruments from the account, wherein processing the withdrawal includes determining, based on an automated assessment of compliance with one or more policies, that the withdrawal is executable without further authentication, and dispense, using the value instrument dispenser, the specified quantity of value instruments.

Conveniently, in this way, withdrawals of value instruments (e.g., cash) may be performed more quickly without the need to enter a second authentication. Further, risk stemming from not requiring a second authentication factor is reduced and/or mitigated through automated assessment of compliance with one or more policies that control or factor into whether or not the transaction is executable. Notably, by allowing the ATM to make withdrawals without requiring a second authentication factor, it may be possible to provide ATMs in locations where the risk of a third-party observing entry of a second authentication factor like a PIN might represent an unacceptable risk. Further, regardless of location, providing withdrawals without requiring a second authentication factor may enhance ATM accessibility such as, for example, to persons identifying with disability. In a particular example, an ATM providing withdrawals without requiring a second authentication factor may improve accessibility to persons identifying with intellectual disability who may have difficulty remembering a PIN and/or to persons who may be unable and or may have difficulty entering a PIN using a keypad. More broadly, providing withdrawals without a second authentication factor may generally speed use of an automated teller machine allowing it to service more transactions in a given interval, especially where many of the transactions performed using that automated teller machine are withdrawals. Notably, in some applications nearly two-thirds of all operations involving some automated teller machines are withdrawals.

In some implementations, the automated teller machine may be a drive-thru automated teller machine. It may be that the wireless communication module is disposed in a component of the drive-thru automated teller machine linked to a body of the drive-thru automated teller machine. That component may be configured to allow displacement thereof away from the body of the drive-thru automated teller machine towards a vehicle visiting the drive-thru automated teller machine.

In some implementations, it may be that the instructions, when executed by the processor, further cause the automated teller machine to: detect, using the wireless communications module, that a second authentication token capable of wireless communication has been brought into communications range of the wireless communications module; communicate with the second authentication token using the wireless communication module to cryptographically authenticate the second token and to receive information identifying a second account associated with the second token; determine, based on an automated assessment of compliance with one or more policies, that a second withdrawal of a specified quantity of value instruments from the second account requires further authentication; and provide an indication requesting provision of another authentication factor.

In some implementations, the automated teller machine may further include an input device coupled to the processor. It may be that the instructions, when executed by the processor, further cause the automated teller machine to receive, using the input device, an identification of the specified quantity of value instruments.

In some implementations, it may be that the specified quantity of value instruments is a pre-defined amount associated with at least one of the token and the account.

In some implementations, it may be that determining, based on the automated assessment of compliance with the one or more policies, that the withdrawal is executable without further authentication includes determining that completing the withdrawal would not exceed a limit on withdrawals from the account without use of the second authentication factor.

In some implementations, it may be that the token includes a payment card.

In some implementations, it may be that the automated teller machine does not include a contact card reader.

In some implementations, it may be that the second authentication factor includes a personal identification number (PIN).

In some implementations, the automated teller machine may be a withdrawal-only automated teller machine.

According to the subject matter of the present application, there may be provided a method of processing a withdrawal of value instruments. The method may include detecting that an authentication token capable of wireless communication has been brought into communications range of an automated teller machine; and communicating, by the automated teller machine, wirelessly with the authentication token to cryptographically authenticate the token and to receive information identifying an account associated with the authentication token. The method may further include, without receiving, by the automated teller machine, user-input providing a second authentication factor, initiating, by the automated teller machine, processing of a withdrawal of a specified quantity of value instruments from the account, wherein processing the withdrawal includes determining, based on an automated assessment of compliance with one or more policies, that the withdrawal is executable without further authentication, and dispensing, by the automated teller machine, the specified quantity of value instruments.

In some implementations, the method may further include detecting that a second authentication token capable of wireless communication has been brought into communications range of the automated teller machine; communicate with the second authentication token to cryptographically authenticate the second token and to receive information identifying a second account associated with the second token; determining, based on an automated assessment of compliance with one or more policies, that a second withdrawal of a specified quantity of value instruments from the second account requires further authentication; and providing an indication requesting provision of another authentication factor.

In some implementations, the method may further include receiving, by the automated teller machine, an identification of the specified quantity of value instruments.

In some implementations, the specified quantity of value instruments may be a pre-defined amount associated with at least one of the authentication token and the account.

In some implementations, it may be that determining, based on the automated assessment of compliance with the one or more policies, that the withdrawal is executable without further authentication includes determining that completing the withdrawal would exceed a limit on withdrawals from the account without use of the second authentication factor.

In some implementations, the authentication token may include a payment card.

In some implementations, the automated teller machine may be operating in an offline mode wherein withdrawals are processed without communicating with an automated teller machine network.

In some implementations, communicating, by the automated teller machine, wirelessly with the authentication token to authenticate the authentication token may include the automated teller machine acting as a relay for communications between the authentication token and a remote authentication server.

In some implementations, the second authentication factor may include a personal identification number (PIN).

According to the subject matter of the present application, there may provided a non-transitory computer-readable storage medium storing instructions that, when executed by a processor of an automated teller machine cause the automated teller machine to perform any one of the above-discussed methods.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1B:
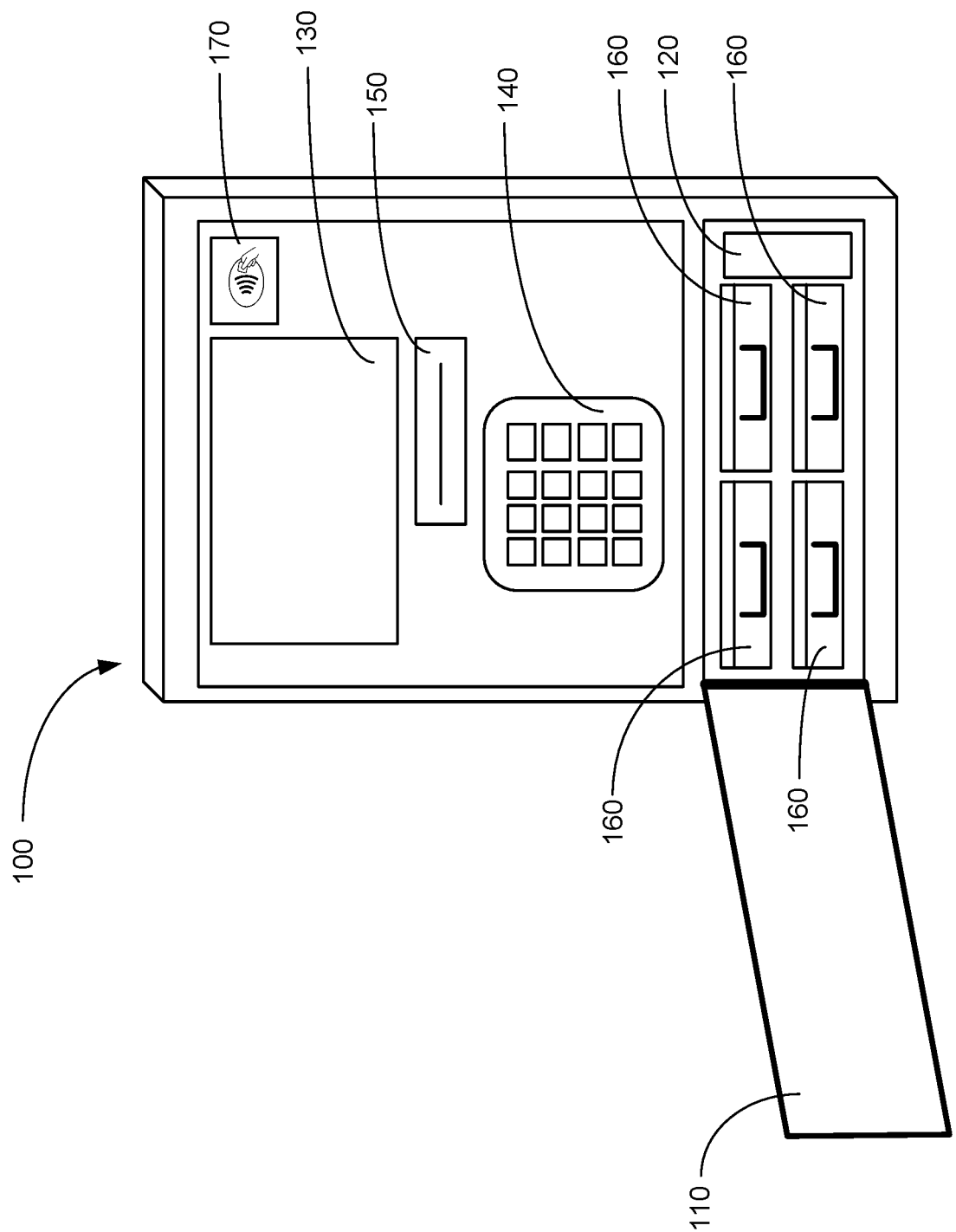

FIG. 1A and FIG. 1B are simplified diagrams showing the automated teller machine 100. FIG. 1A shows the automated teller machine 100 with an access panel 110 closed and may correspond to the configuration of the automated teller machine 100 during use. FIG. 1B shows the automated teller machine 100 with the access panel 110 opened to reveal certain internal components and may correspond to the configuration of the automated teller machine 100 during servicing.

As illustrated, the automated teller machine 100 may include a controller 120 (FIG. 1B), a display 130, a keypad 140, an item dispenser 150, cassettes 160 (FIG. 1B), and a wireless token reader 170.

As further described below, the controller 120 is a computing device. For example, the controller 120 may include a processor that executes instructions retrieved from a computer-readable medium thereby causing the automated teller machine 100 to perform operations for providing access to banking services including access to withdrawals that are authorized based on a single authentication factor.

The display 130 may for example, be a liquid-crystal display (LCD), a cathode-ray tube (CRT), or the like. The display 130 is for presenting information such as to a user of the automated teller machine 100. The display 130 may present information under control of the controller 120.

The keypad 140 is an input device allowing input to be provided to the automated teller machine 100. Input received via the keypad 140 may be conveyed to the controller 120.

The item dispenser 150 is a device allowing value instruments to be dispensed by the automated teller machine 100. For example, it may be that the item dispenser 150 provides a single slot through which value instruments may be dispensed. Additionally or alternatively, the item dispenser 150 may provide multiple slots. It may be that components or units of the item dispenser 150 are specialized to a particular type or types of value instrument. For example, a particular component or unit of the item dispenser 150 may be adapted to receiving and/or dispensing banknotes of one denomination, while another component or unit may be adapted to receiving and/or dispensing banknotes of another denomination. Alternatively, it may be that the item dispenser 150 is a monolithic unit that handles all manner of value instruments.

As mentioned above, the automated teller machine includes one or more cassettes 160. The item dispenser 150 is in communication with the cassettes 160. Some or all of the cassettes 160 may be adapted to dispense value instruments. For example, some of the cassettes 160 may be for dispensing banknotes of particular denominations.

The item dispenser 150 and the cassettes 160 may be collectively considered a value instrument dispenser adapted to dispense value instruments such as to satisfy withdrawals from the automated teller machine 100.

The wireless token reader 170 allows data to be exchanged with wireless authentication tokens. The wireless token reader 170 is a wireless communications module. The wireless token reader 170 may communicate with authentication tokens using one or more wireless protocols. In a particular example, the wireless token reader may use near-field communication (NFC) to communicate with authentication tokens. Authentication tokens with which the wireless token reader 170 communicates may take a variety of forms. For example, authentication tokens with which the wireless token reader 170 may communicate may include NFC-enabled ISO-sized cards and/or NFC-enabled devices such as, for example, NFC-enabled smartphones, smartwatches or other wearables, or implants such as, for example, implantable NFC-enabled microchips.

The automated teller machine 100 may be deployed in a variety of manners. For example, the automated teller machine 100 may, in some cases, operate in a partially offline mode. Additionally or alternatively, the automated teller machine 100 may communicate with one or more other computing devices in order to perform its various functions.

Figure 2:
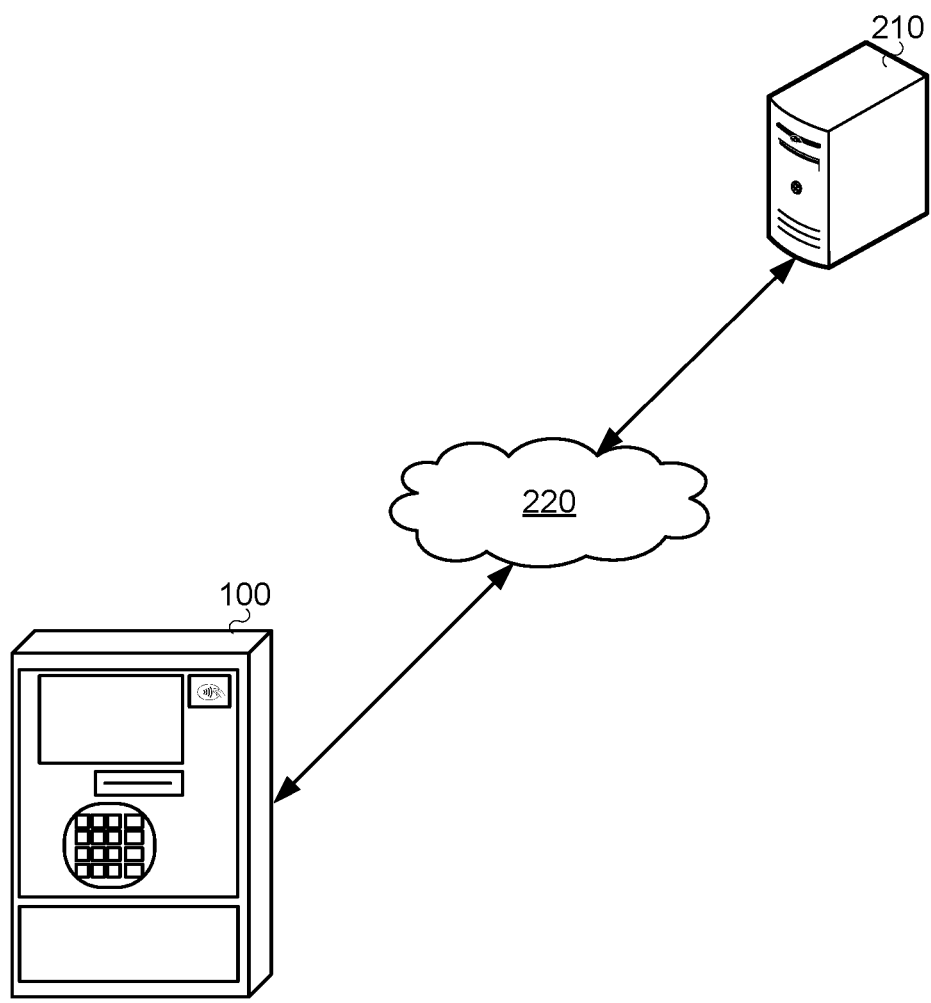
FIG. 2 is a schematic operation diagram illustrating an operating environment of the automated teller machine of FIGS. 1A and 1B.

An example operating environment in which the automated teller machine 100 communicates with another computing device is shown in FIG. 2. As illustrated, the automated teller machine 100 may be in communication with a back-office server system 210 via a network 220.

The automated teller machine 100 and the back-office server system 210 may be in geographically disparate locations. Put differently, the automated teller machine 100 may be remote from the back-office server system 210, and vice-versa.

The automated teller machine 100 and the back-office server system 210 are computer systems.

As mentioned above, the automated teller machine 100 is adapted to provide access to banking services such as, for example, withdrawals executed based on only a single authentication factor.

The back-office server system 210 is a server that provides one or more back-office services to a financial institution including, for example, maintenance of accounts, payment processing, fraud detection and the like. The back-office server system 210 may, for example, be a mainframe computer, a minicomputer, or the like. In some embodiments, the back-office server system 210 may be formed of or may include one or more computing devices. For example, the back-office server system 210 may include and/or may communicate with multiple computing devices such as, for example, database servers, compute servers, and the like. For example, the back-office server system 210 may be, may include and/or may communicate with an ATM switch and/or an ATM middle tier system. Multiple computing devices such as these may be in communication using a computer network. For example, such computing devices may communicate using a local-area network (LAN). In some embodiments, the back-office server system 210 may include multiple computing devices organized in a tiered arrangement. For example, the back-office server system 210 may include middle tier and back-end computing devices such as, for example, the aforementioned ATM middle tier system and/or one or more financial institution and/or ATM system back-end server systems. In some embodiments, the back-office server system 210 may be a cluster formed of a plurality of interoperating computing devices.

The network 220 is a computer network. In some embodiments, the network 220 may be an internetwork such as may be formed of one or more interconnected computer networks. For example, the network 220 may be or may include an Ethernet network, an asynchronous transfer mode (ATM) network, a wireless network, and/or the like. Additionally or alternatively, one or more devices may communicate with the computer network by way of a plain-old telephone service (POTS) line such as using a modem. In a particular example, the automated teller machine 100 may communicate with the back-office server system 210, directly or indirectly, by way of a POTS line.

As further described below, in some embodiments, the automated teller machine 100 and the back-office server system 210 may co-operate to allow the automated teller machine 100 to provide access to banking services such as, for example, withdrawals including withdrawals such as may be authorized based on a single authentication factor.

Figure 3:
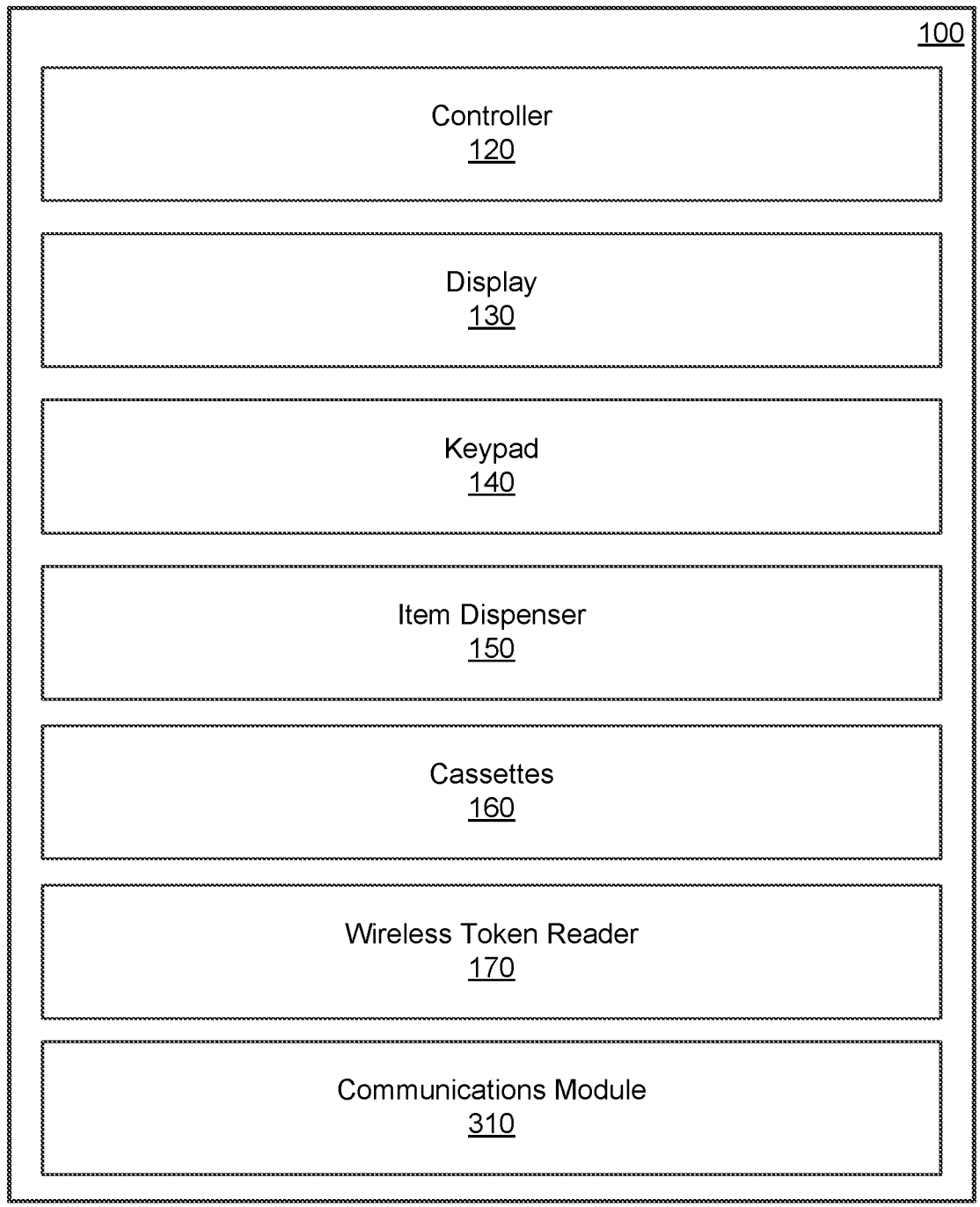
FIG. 3 is a logical block diagram of the automated teller machine of FIGS. 1A and 1B.

Returning to discussion of particulars of the automated teller machine 100, FIG. 3 is a logical block diagram of the automated teller machine 100.

As described above, the automated teller machine 100 may include a controller 120, a display 130, a keypad 140, an item dispenser 150, cassettes 160, and/or a wireless token reader 170. Additionally, as shown in FIG. 3, the automated teller machine 100 may include a communications module 310.

The communications module 310 allows the automated teller machine 100 to communicate with other computing devices and/or various communications networks such as, for example, the network 220. In other words, the communications module 310 may allow the automated teller machine 100 to send or receive communications signals. Communications signals may be sent or received according to one or more protocols or according to one or more standards. For example, the communications module 310 may allow the automated teller machine 100 to communicate via an Ethernet network, an ATM network, a telephone network, and/or via cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 310 may allow the automated teller machine 100 to communicate via Wi-Fi™ or via some combination of one or more networks or protocols. In some embodiments, the wireless token reader 170 may be included in, may rely on, or may include the communications module 310.

Figure 4:
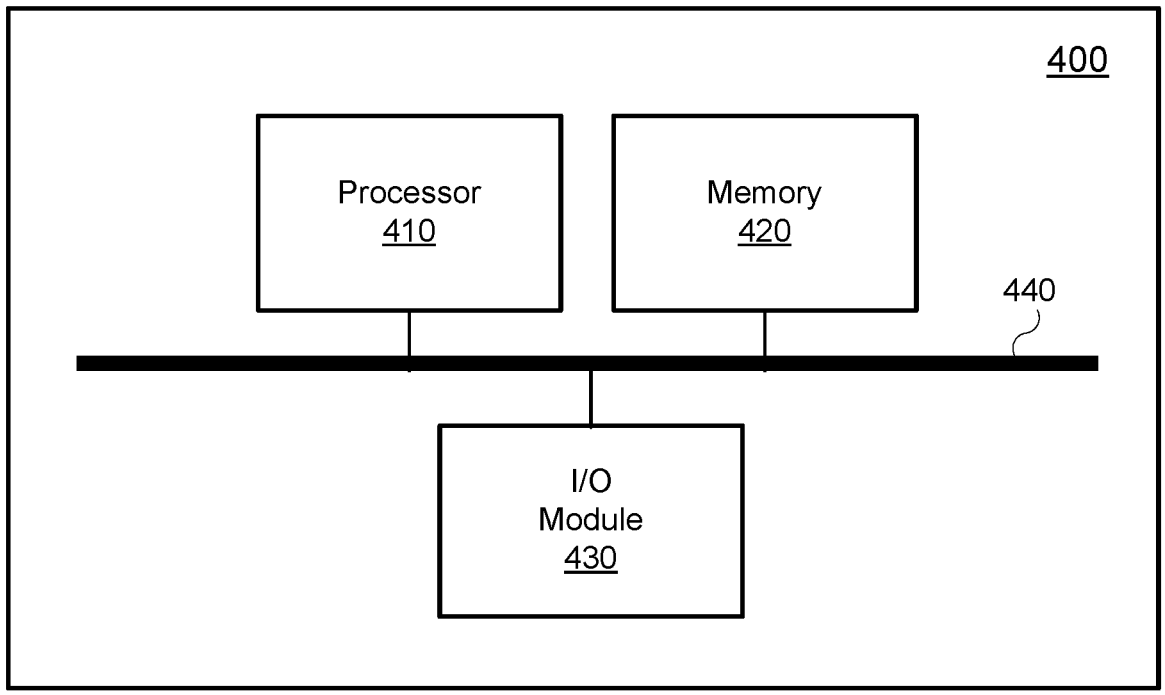
FIG. 4 is a high-level operation diagram of an example computing device.

FIG. 4 is a high-level operation diagram of an example computing device 400. In some embodiments, the example computing device 400 may be exemplary of one or more of the controller 120 (FIG. 1B) and the back-office server system 210 (FIG. 2). As will be discussed in greater detail below, the automated teller machine 100 (FIG. 1) (and, potentially, the controller 120 in particular) includes software that adapts it to perform a particular function. More particularly, software of the automated teller machine 100 adapts it to perform functions including withdrawals authorized based on a single authentication factor. As mentioned above, the automated teller machine 100 may co-operate with the back-office server system 210 in providing access to banking services. Software of the back-office server system 210 may adapt it to co-operate with the automated teller machine in providing access to banking services.

The example computing device 400 includes a variety of modules. For example, as illustrated, the example computing device 400 may include a processor 410, a memory 420, and an input/output (I/O) module 430. As illustrated, the foregoing example modules of the example computing device 400 are in communication over a bus 440.

The processor 410 is a hardware processor. The processor 410 includes at least one physical processor and at least one core, but may also include more than one physical processor and/or more than one processor core. For example, the processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are each a non-transitory computer-readable storage medium. A computer-readable medium may be organized using a file system such as may be administered by an operating system governing overall operation of the example computing device 400.

The I/O module 430 allows the example computing device 400 to interact with devices such as, for example, peripherals to send and receive data. The I/O module 430 may, for example, allow the example computing device 400 to interface with input devices such as, for example, keypads, keyboards, pointing devices, and the like. In another example, the I/O module 430 may, for example, allow the example computing device 400 to interface with output devices such as, for example, displays, printers, and the like. In a particular example, where the example computing device 400 forms a part of the automated teller machine 100 (FIG. 1) such as, for example, if the example computing device 400 is or forms a part of the controller 120 (FIGS. 1A and 1B) of the automated teller machine 100, the I/O module 430 may allow the example computing device 400 to interface with one or more of the display 130, the keypad 140, the item dispenser 150, the wireless token reader 170, and/or the communications module 310 depending, for example, on the particular configuration of the controller 120 and the components present in a given automated teller machine.

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

Figure 5:
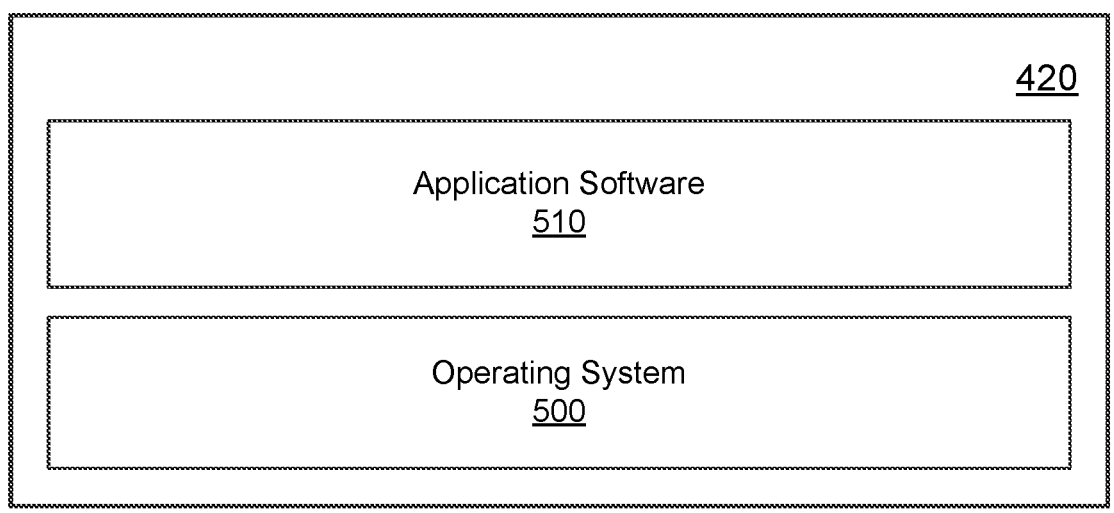
FIG. 5 depicts an example simplified software organization of the example computing device of FIG. 4.

FIG. 5 depicts a simplified organization of software components stored in the memory 420 of the example computing device 400. As illustrated these software components include an operating system 500 and application software 510.

The operating system 500 is software. The operating system 500 allows the application software 510 to access the processor 410, the memory 420, and the I/O module 430. The operating system 500 may be, for example, UNIX™, Linux™, Microsoft™ Windows™, Apple OSX™ or the like.

The application software 510 adapts the example computing device 400, in combination with the operating system 500, to operate as a device performing a particular function. For example, the application software 510 may cooperate with the operating system 500 to adapt a suitable embodiment of the example computing device 400 to operate as the controller 120 (FIGS. 1B and 2) of the automated teller machine 100 or as the back-office server system 210 (FIG. 2).

Operations performed by the automated teller machine 100 will be described below with reference to FIG. 6.

Figure 6:
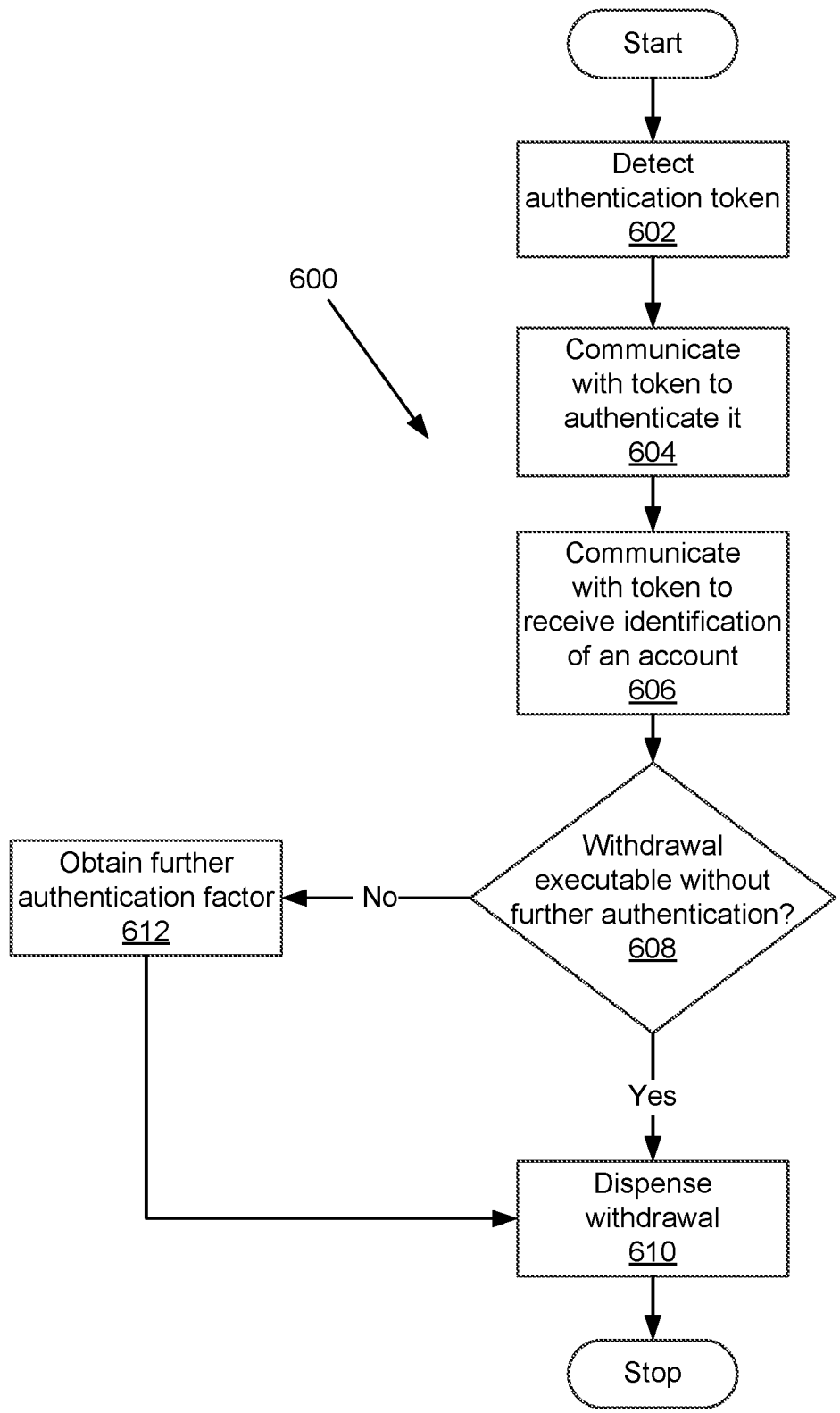
FIG. 6 provides a flowchart depicting example operations performed by the automated teller machine of FIGS. 1A and 1B in servicing a withdrawal.

FIG. 6 provides a flowchart 600 depicting example operations performed in a method of servicing a withdrawal. Operations starting with an operation 602 and continuing onward are performed by one or more processors of one or more computing device, such as, for example, the processor 410 (FIG. 4) of one or more suitably configured instances of the example computing device 400 (FIG. 4), executing software such as, for example, a suitable instance of the application software 510 (FIG. 5). In a particular example, one or more of the operations may be performed by a processor of the controller 120 (FIGS. 1B and 2) of the automated teller machine 100 and/or a processor of the back-office server system 210. Additionally or alternatively, one or more of the operations may be performed by a processor of an authentication token and/or by such a processor in co-operation with one or both of a processor of the controller 120 of the automated teller machine 100 and a processor of the back-office server system 210 as further described below.

At the operation 602, the automated teller machine 100 detects that an authentication token capable of wireless communication (which could be referred to as a wireless authentication token) has been brought into the communications range of the automated teller machine 100. For example, the automated teller machine 100 may detect using the wireless token reader 170 that a wireless authentication token has been brought into communications range of the wireless token reader 170. Additionally or alternatively, another wireless communications module such as, for example, the communications module 310 may be employed to detect a proximate authentication token.

The authentication token is a physical device maintaining metadata, including metadata for authenticating wirelessly with devices such as the automated teller machine 100 and metadata allowing identification of at least one account of a financial institution. Such a wireless authentication token may take a variety of forms. In one example, the wireless authentication token may be an NFC-enabled token, such as for example, an NFC card like an NFC credit or debit card (e.g., a contactless payment card). In another example, the wireless authentication token may be a device like a smartphone, a fob, a tablet, a smartwatch or other wearable, or an implant such as, for example, an implantable microchip. In a particular example, the wireless authentication token may be an NFC-enabled smartphone. For example, the wireless authentication token could be an NFC-enabled smartphone supporting NFC-card emulation.

In a particular example, of an authentication token being brought into the communications range of the automated teller machine 100, a user may "tap" their contactless payment card or device on the wireless token reader 170.

Following the detection of the wireless authentication token at the operation 602, an operation 604 is next.

At the operation 604, the automated teller machine 100 communicates with the authentication token using the wireless communication module to authenticate the token. In particular, the automated teller machine 100 and the authentication token may exchange one or more messages or other communications in order to cryptographically authenticate the authentication token. For example, a challenge-response cryptographic protocol may be employed in authenticating the authentication token. In a particular example, dynamic data authentication (DDA) or combined DDA/Application Cryptogram Generation (CDA) or variations thereof may be employed. Details of DDA and DDA/CDA are set out in EMV Book 2—Security and Key Management (version 4.3, November 2011, available from EMVCo™), the contents of each of which are incorporated herein by reference in their entirety.

In some embodiments, the automated teller machine 100 may perform authentication of the authentication token offline, without the automated teller machine 100 communicating with any remote servers. In other embodiments, authentication may involve an online authentication technique in which the automated teller machine 100 communicates with a server such as, for example, the back-office server system 210 (FIG. 2) by way of a network such as, for example, the network 220 (FIG. 2), in authenticating the authentication token. In a particular example, the network may be an automated teller machine network such as, for example, the PLUS™ or Interac™ networks. It may be that the automated teller machine 100 acts as a proxy or relay for communications between a remote authentication server responsible for authenticating the authentication token as valid and the authentication token. Put differently the automated teller machine 100 communicating wirelessly with the authentication token to authenticate it may include the automated teller machine acting as a relay for communications between the authentication token and a remote authentication server.

Additionally, the authentication token may authenticate the automated teller machine 100 as being a valid automated teller machine based on the exchange. In other words, authentication between the authentication token and the automated teller machine 100 may be mutual authentication in which the automated teller machine authenticates the authentication token and vice-versa. Mutual authentication may be online (involving communication with a server) or offline (involving only communications between the automated teller machine 100 and an authentication token).

Following the operation 604, an operation 606 is next.

At the operation 606, the automated teller machine 100 communicates, using a wireless communication module, with the authentication token to receive information identifying an account associated with the token. For example, the authentication token may provide a payment account number (PAN) to the automated teller machine 100. In some embodiments, the automated teller machine 100 may receive an identifying value from the automated teller machine 100 and may then use that value to perform a look-up to identify an account such as, for example, a bank account number. In a particular example, the automated teller machine 100 may communicate one or more values received from the authentication token and/or determined based on the authentication token to a remote server such as, for example, the back-office server system 210, via a network such as, for example, the network 220, so that the server may perform one or more look-ups in order to obtain account information that the server may then communicate to the automated teller machine 100. It may be that a network so employed is an automated teller machine network such as, for example, the PLUS™ or Interac™ networks.

Following the operation 606, an operation 608 next.

At the operation 608, processing of a possible withdrawal of a specified quantity of value instruments (e.g., banknotes) from the identified account (i.e., the account identified at the operation 606) is initiated.

In some embodiments, this may involve receiving user input identifying an amount to be withdrawn from the identified account. For example, an amount could be received by way of the keypad 140, through the use of one or more context buttons (not shown) such as may be provided alongside the display 130, and/or via the display 130 such as, for example, if the display 130 is a touchscreen. It may be that the user-input identifies an amount to be withdrawn from the account. Additionally or alternatively, the user-input may identify quantities of particular denominations of value instruments to be withdrawn. In a particular example, user-input may identify that $100 is to be withdrawn and/or may specify that 3×$20 bills, 2×$10 bills, and 4×$5 bills are to be withdrawn.

In some embodiments, the amount to be withdrawn may be a pre-defined amount. Conveniently, the amount to be withdrawn being a pre-defined amount may avoid the need to receive user-input identifying the amount to be withdrawn. Consequently, if all withdrawals using a given instance of the automated teller machine 100 as for pre-defined amounts, input devices for receiving user-input identifying the amount to be withdrawn can potentially be omitted from the automated teller machine 100. For example, if all withdrawals using a given machine are for pre-defined amounts and a second authentication factor is not required (e.g., no PIN is required) then input devices like the keypad 140 could be omitted from the automated teller machine entirely. Such a variation of the automated teller machine 100 is discussed in greater detail below.

Pre-defined amounts may be defined in a variety of manners.

In some cases, a pre-defined amount could be associated with the authentication token (e.g., a particular ATM card) and/or the identified account. For example, in configuring their authentication token and/or their account, users may be permitted to identify a pre-determined "fast cash" amount for use in making quick withdrawals without having to provide a second authentication factor.

Additionally or alternatively, the pre-defined amount could be associated with a customer such as, for example, a particular customer with which the authentication token and/or the identified account is associated. It may, for example, be that the customer is able to pre-define an amount for single-authentication factor withdrawals at an earlier time (e.g., before the method of FIG. 6 is performed) and this amount may then be stored in a profile associated with that customer such as, for example, in a database. In some cases, the pre-determined amount selected by the customer may include a pre-determined mix of value instruments of specified denominations as further described below. The automated teller machine 100 may communicate with a server such as, for example, the back-office server system 210 via a network such as, for example, the network 220 to receive such an amount from a profile. For example, the server may obtain it from the aforementioned profile and responsive to the automated teller machine 100 and may then provide the amount to the automated teller machine responsive to the request.

Additionally or alternatively, there may be a pre-defined amount associated with the automated teller machine 100 and/or the wireless token reader 170. Such an amount could, for example, be a fallback amount for cards/users/accounts for which other pre-defined amount has been configured. Additionally or alternatively, it could be that, in some embodiments, the automated teller machine includes multiple wireless token readers each associated with a different pre-defined amount and that users may select an amount to withdraw by bringing their authentication token into proximity of the wireless token reader associated with a particular amount they wish to withdraw.

In some cases, specification of such a pre-defined "fast cash" amount may include identification of desired or preferred quantities of banknotes of particular denominations to be provided in satisfying the withdrawal such as, for example, the above example of $100 made up of 3×$20 bills, 2×$10 bills, and 4×$5 bills.

However the specified quantity of value instruments desired to be withdrawn from the account is identified, processing the withdrawal includes determining whether or not the withdrawal is executable without further authentication.

Whether or not the withdrawal is executable without further authentication may be determined based on an automated assessment of compliance with one or more policies.

The one or more policies may be identified based on the authentication token, an account identified at the operation 606 and/or profiles of one or more customers associated with the authentication token and/or the account. For example, the policies may be identified by performing a database look-up based on information obtained from the authentication token and/or information deriving therefrom. The policies may be identified by the automated teller machine 100, by the authentication token, and/or by a remote server such as, for example, the back-office server system 210.

Further, whether executing the withdrawal would comply with such policies may be determined by the automated teller machine 100, by the authentication token, and/or by a remote server such as, for example, the back-office server system 210. In a particular example, the automated teller machine 100 may co-operate with one or both of the authentication token and/or one or more remote servers in order (e.g., via a network such as, for example, the network 220) to identify the relevant policies and/or to assess compliance therewith.

Policies may be selected in order to or in an effort to minimize the risk of fraudulent withdrawals. Additionally or alternatively, policies may be intended to mitigate such risks such as, for example, by limiting the loss to the financial institution associated with the account identified at the operation 606 such as, for example, by attempting to limit the amount of such losses. At the same time, policies may also be selected in order to limit inconvenience to particular customers. For example, a high-value customer of a financial institution may be afforded a more lenient policy if this institution is willing to accept a greater risk in order to maintain a relationship with that customer.

Policies may take a variety of forms.

For example, a policy may provide an upper limit of withdrawals made without a second authentication factor within a given interval (e.g., a day, a week, a month). In some cases, multiple such policies may be provided such as, for example, a daily limit and a weekly limit. In some cases, such a policy may be reset by suitable account activity such as, for example, an intervening transaction utilizing the authentication token in which a second authentication factor is provided. In other words, the policy may involve a limit on the number of successive withdrawals (e.g., from the identified account) that can be made without use of a second authentication factor.

In another example of a policy, a limit on the total amount withdrawn within a given interval (e.g., a day, a week, a month) may be provided. In some cases, multiple such policies may be provided such as, for example, a daily total limit and a weekly total limit. In some cases, such a policy may be reset by suitable activity or occurrence such as, for example, an intervening transaction utilizing the authentication token in which a second authentication factor is provided.

In another example of a policy, a proposed withdrawal may be assessed using an automated anti-fraud system of a financial institution to determine whether it is approvable. For example, it could be that particulars of the withdrawal including, for example, amount, location of the ATM, time of day, etc. may be provided to an automated anti-fraud server via a network such as, for example, the network 220, and the anti-fraud server may, responsive to provision of such information, provide an indication as to whether the withdrawal should be permitted without provision of a second authentication factor.

Various policies may be considered in combination. In some embodiments, compliance with such a policy set may require that all of the policies are satisfied (e.g., all conditions of all of the policies are met). In other cases, compliance may require any one of a given set of policies are satisfied. Additionally or alternatively, compliance may require that one or another of various policies are satisfied while any of another group of policies are not violated. In a particular example, relationships between policies may be expressed by a Boolean combination of policies that, when true, allows the withdrawal to proceed, while the withdrawal will not be allowed based on a single authentication factor alone if the combination is false (or vice-versa).

If it is determined based on the automated assessment of compliance with one or more policies that the withdrawal is executable without further authentication, an operation 610 is next. Alternatively, if it is determined that the withdrawal is not executable without further authentication and that, therefore, further authentication would be required in order to execute the withdrawal, then an operation 612 is next.

At the operation 610, the withdrawn amount is dispensed. In other words, specified quantity of value instruments is dispensed by the automated teller machine 100 to satisfy the withdrawal. Notably, where the operation 610 is reached directly from the operation 608, the dispensing will occur without the automated teller machine 100 or a server having received (or sought) user-input providing a second authentication factor. For example, no PIN is required in order to for the withdrawal and the dispensing of value instruments to proceed.

The value instruments are dispensed by the automated teller machine 100 by way of a value instrument dispenser such as, for example, the combination of the item dispenser 150 and the cassettes 160.

Where the specified quantities of value instruments includes an identification of particular denominations, it may be expected that an ATM servicing a withdrawal will provide those denominations on a "best effort" basis, providing a partial amount and/or different denominations to make up the same total amount (or a lesser but close amount) where sufficient banknotes of a particular denomination are not available from that ATM. Alternatively, where such an identification of particular denominations is provided—e.g., as part of a pre-determined amount like a "fast cash" amount—it may be that the withdrawal will fail with an error if it cannot be satisfied as specified. In yet another alternative, a user may be asked to confirm that an alternative configuration of value instruments providing the same total amount (or a close amount thereto) is acceptable such as, for example, by way of providing input through use of the keypad 140 and/or by again bringing the authentication token item range of the wireless token reader 170 (e.g., by "tapping" their token on the wireless token reader 170).

In preparation for or further to dispensing the specified quantity of value instruments, the automated teller machine 100 takes steps to provide for a debit of the account identified at the operation 606 in the accordance with total value of the quantity of value instruments dispensed. For example, it may be that the account is to be debited by the total amount represented by the specified quantity of value instruments. Such a debit may involve communicating— e.g., via a network such as the network 220—with a remote server such as, for example, the back-office server system 210. In a particular example, the network so employed may be an automated teller machine network such as, for example, the PLUS™ or Interac™ networks. Notably, a debit of an account as a part of the withdrawal transaction may, in some embodiments, be performed in manners consistent with or similar to reflecting such a debit further to a conventional two-authentication-factor ATM withdrawal.

Alternatively, if it is determined at the operation 608 that the withdrawal is not executable without further authentication and that, therefore, further authentication would be required in order to execute the withdrawal, then the operation 612 follows.

At the operation 612, an additional authentication factor may be obtained. For example, an indication requesting provision of another authentication factor may be provided such as, for example, by way of the display 130. In a particular example, the second authentication factor may be received through user-input via an input device of the automated teller machine 100. For example, the second authentication factor may be or may include a personal identification number (PIN) to be provided by way of the keypad 140. Accordingly, it may be that an indication is provided soliciting such user-input.

The second authentication factor may be received and then verified. In some embodiments, the automated teller machine 100 may communicate with a remote server such as, for example, the back-office server system 210 via a network, such as, for example, the network 220, in order to validate the second authentication factor. Additionally or alternatively, the second authentication factor may be validated by communicating with the authentication token such as using the wireless token reader 170.

If the second authentication factor is confirmed, then the operation 610 is next so that the withdrawal may be satisfied. Alternatively, if the second authentication factor is not provided or validation thereof fails, an error may be provided and the withdrawal may fail.

The operations forming the method of FIG. 6 are provided by way of example. Variations on those operations and the method of FIG. 6 are possible while remaining within the scope of the subject matter of the present application.

For example, it could be that communication with the authentication token in order to validate it and communication with the authentication token in order to obtain information identifying an account form part of the same exchange. It could, for example, be that the information identifying the account is obtained as a part of or as a by-product of validating the authentication token.

Figure 7:
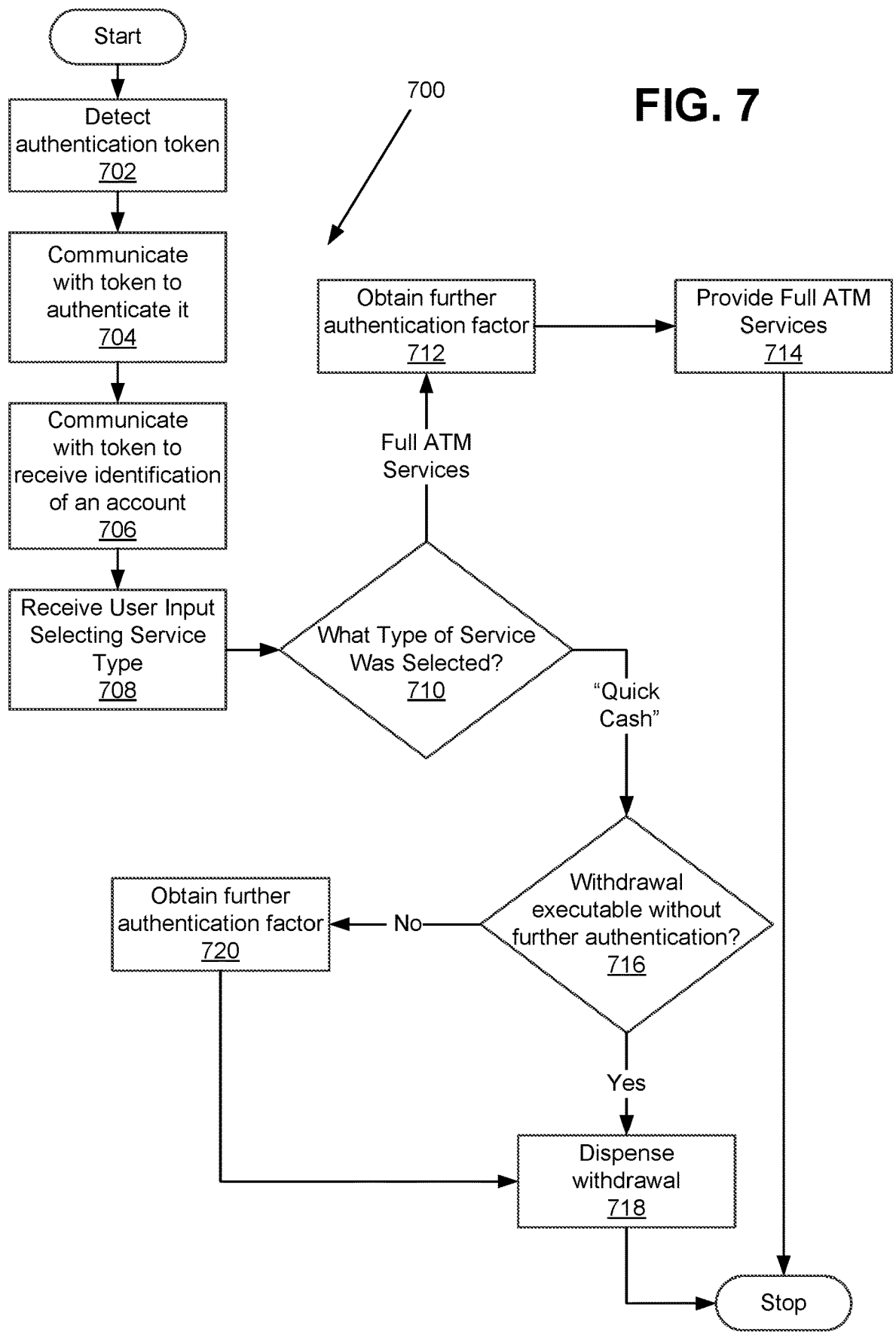
FIG. 7 provides a flowchart depicting example operations performed by the automated teller machine of FIGS. 1A and 1B in selectively either servicing a withdrawal and/or providing access to a full suite of transactions.

In another example of a variation, FIG. 7 provides a flowchart 700 depicting example operations performed in selectively either servicing a withdrawal and/or providing access to a full suite of transactions (e.g., deposits, transfers, and withdrawals). Operations starting with an operation 702 and continuing onward are performed by one or more processors of one or more computing device, such as, for example, the processor 410 (FIG. 4) of one or more suitably configured instances of the example computing device 400 (FIG. 4), executing software such as, for example, a suitable instance of the application software 510 (FIG. 5). In a particular example, one or more of the operations may be performed by a processor of the controller 120 (FIGS. 1B and 2) of the automated teller machine 100 and/or a processor of the back-office server system 210. Additionally or alternatively, one or more of the operations may be performed by a processor of an authentication token and/or by such a processor in co-operation with one or both of a processor of the controller 120 of the automated teller machine 100 and a processor of the back-office server system 210.

At the operation 702, the automated teller machine 100 detects that a wireless authentication token has been brought into the communications range of the automated teller machine 100. The operation 702 is analogous to the operation 602 (FIG. 6) and similar considerations apply to the operation 702 as to the operation 602. For example, the operation 702 may have details that are the same or similar to the operation 602.

Following the operation 702, an operation 704 is next.

At the operation 704, the automated teller machine 100 communicates with the authentication token using the wireless communication module to authenticate the token. The operation 704 is analogous to the operation 604 (FIG. 6) and similar considerations apply to the operation 704 as to the operation 604. For example, the operation 704 may have details that are the same or similar to the operation 604.

Following the operation 704, an operation 706 is next.

At the operation 706, the automated teller machine 100 communicates, using a wireless communication module, with the authentication token to receive information identifying an account associated with the token. The operation 706 is analogous to the operation 606 (FIG. 6) and similar considerations apply to the operation 706 as to the operation 606. For example, the operation 706 may have details that are the same or similar to the operation 606.

Following the operation 706, an operation 708 is next.

At the operation 708, user input selecting a service type is received by the automated teller machine 100. In particular, the input may select between a withdrawal such as may potentially be executed without requiring a second authentication factor (e.g., "fast cash" or "quick cash") and between receiving access to a full suite of ATM services such as, for example, access to deposits, withdrawals, transfers, etc.

User input indicating a type of service may be received by way of an input device, such as, for example, the keypad 140. In some cases, a prompt may be provided soliciting such input such as, for example, by way of user interface such as may be presented by way of the display 130.

Following receipt of the user input at the operation 708, an operation 710 is next.

At the operation 710, the automated teller machine 100 evaluates the input received at the operation 708. If the provided user-input indicates a choice to access a full suite of ATM services ("Full ATM Services"), an operation 712 is next. If the provided user-input indicates a choice to proceed with a withdrawal such as may potentially be executed without requiring a second authentication factor ("Quick Cash"), an operation 718 is next.

At the operation 712, a further authentication factor is obtained. For example, the user may be prompted to provide a PIN. Considerations and details of the operation 712 may be the same or similar to the operation 612 above.

Following the operation 712, an operation 714 is next.

At the operation 714, access to a full suite of ATM services may be provided. Notably the combination of the operation 712 and the operation 714 may correspond to receiving a user PIN at a conventional ATM and then providing access to services by a conventional ATM.

As mentioned above, if the user selected to proceed with "quick cash" withdrawal at the operation 708, an operation 716 follows the operation 710.

At the operation 716, processing of a possible withdrawal of a specified quantity of value instruments (e.g., banknotes) from the identified account (i.e., the account identified at the operation 706) is initiated. The operation 716 is analogous to the operation 608 (FIG. 6) and similar considerations apply to the operation 716 as to the operation 608. For example, the operation 716 may have details that are the same or similar to the operation 608.

Following the operation 716, depending on whether the withdrawal is executable without further authentication, an operation 718 or an operation 720 is next. The operation 718 and the operation 720 are analogous to the operation 610 and 612 (FIG. 6), respectively, and similar considerations apply to the operation 718 and to the operation 720 as apply to corresponding one of the operations 610-612. For example, the operation 718 may have details that are the same or similar to the operation 610 and similarly for the operation 720 and the operation 612. For example, as illustrated, the operation 718 may follow the operation 720 where the withdrawal is not executable without receipt of a further authentication factor, analogous to how the operation 610 may follow the operation 612 in similar circumstances.

As noted above, the methods of FIG. 6 and FIG. 7 and the automated teller machine 100 are each capable of variation.

In some embodiments, the automated teller machine 100 may include other components. For example, the automated teller machine 100 may include a contact card reader for reading magnetic stripe and/or chip ATM cards. Where a customer employs such a card reader, it may be that single factor withdrawals are not permitted. Alternatively, it may be that the insert of a chip card (e.g., an EMV-enabled card) allows similar authentication of the card and the obtaining of analogous information as at the operations 604 and 606 and that a method akin to the method of FIG. 6 (or FIG. 7) can be accessed based on such information in order to executed single-authentication-factor withdrawal.

In any event, it is contemplated that the automated teller machine 100 may omit such contact card reader as analogous function may be provided by the wireless token reader 170. Put differently, it may be that the automated teller machine 100 does not include a contact card reader. It is noted that in conventional automated teller machines, such contact card readers may be the source of many failures or breakdowns. Accordingly, it may be desirable to omit such a component in order to provide a more reliable automated teller machine.

Figure 8:
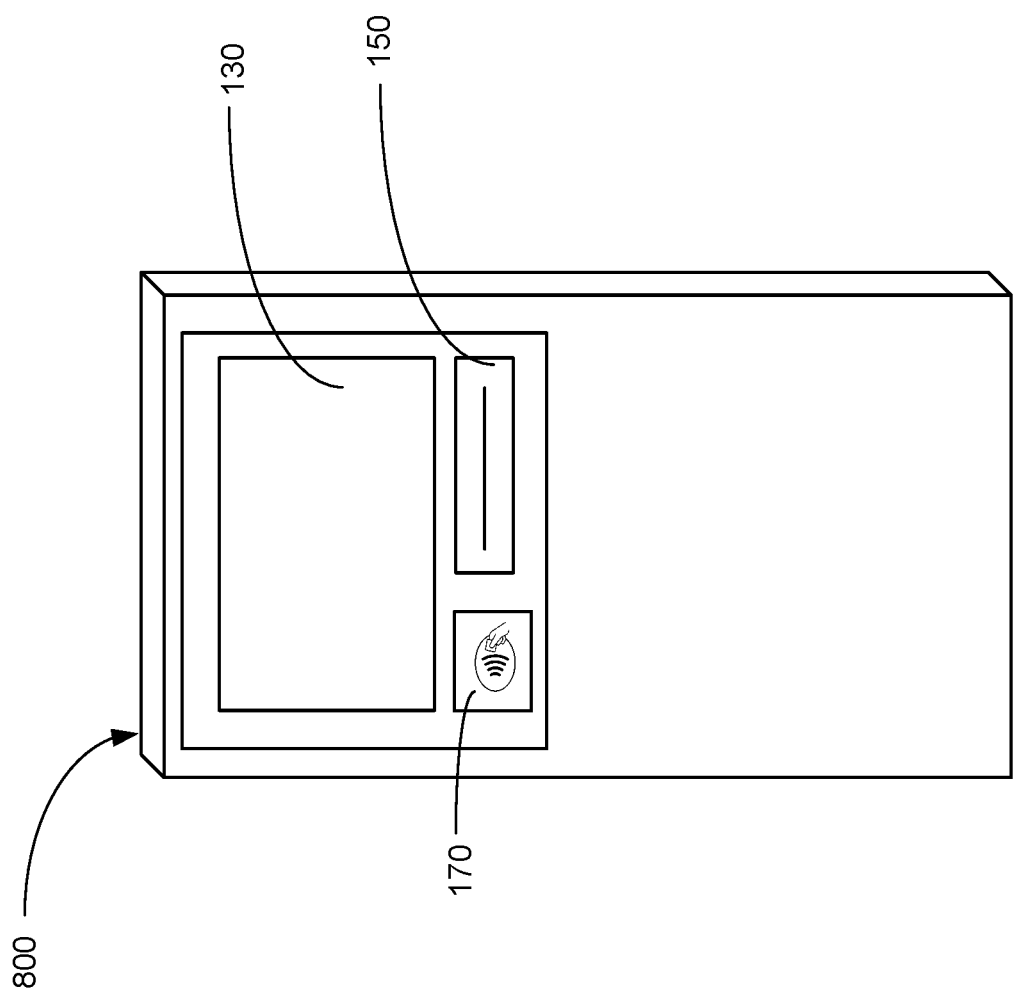
FIG. 8 shows a variant of the automated teller machine of FIGS. 1A and 1B.

In another example of a variation of the automated teller machine 100, FIG. 8 shows an automated teller machine 800 which is a variation of the automated teller machine 100 in which the keypad 140 has been omitted. The automated teller machine 800 may have internals analogous to the automated teller machine 100 and may perform operations analogous thereto.

Notably, however, it may that because the automated teller machine 800 does not have a keypad, it cannot receive a PIN as a second authentication factor. Additionally or alternatively, the automated teller machine 800 may omit components necessary for servicing deposits (e.g., deposit cassettes, item scanners, etc.). Accordingly, it may be that the automated teller machine 800 is a withdrawal-only ATM. More particularly, it may be that the automated teller machine 800 is a single-authentication-factor withdrawal-only ATM such as may be referred to as a "fast cash" ATM. Notably, it may also be that such a "fast cash" ATM also omits one or more output devices such as, for example, a display (e.g., the display 130), if, for example, only withdrawals of pre-determined amounts are permitted. An automated teller machine omitting one or more components (e.g., a keypad, a display, etc.) may be more inexpensive to manufacture and/or may be more reliable than a conventional ATM and/or the automated teller machine 100 due to reduction in costs or failures attributable otherwise attributable to the omitted components.

In acting as a "fast cash" single-authentication-factor-only withdrawal-only automated teller machine ("a withdrawal kiosk"), the automated teller machine 800 may perform a variation of the method illustrated in FIG. 6. In particular, it may be that where it is determined at the operation 608 that the withdrawal is not executable without further authentication, then, rather than, proceeding to the operation 612, the withdrawal may simply fail and an error may be provided.

The automated teller machine 800 may be particularly suited for deployment in particular environments. For example, it may be preferred to deploy conventional automated teller machines in isolated areas of a given venue so as to provide privacy for users of the automated teller machine in performing operations such as, for example, the entry of sensitive information such as personal identification numbers and/or the display of sensitive information such as account details. By contrast, the automated teller machine 800, because it may not need to provide entry and/or to display such sensitive information in order to service single-authentication factor withdrawals, may be deployable in less-isolated areas as might not be favoured for deployment of a conventional ATM. For example, it may be that the automated teller machine 800 can be deployed in a busy area of a train station or a sports venue. Conveniently, it may be that such areas offer benefits as compared to more isolated areas, such as, for example a potentially reduced risk of robbery of the ATM and/or its users.

In another example, the automated teller machine 800 may be particularly suited for deployment in drive-thru scenarios in which customers are expected to operate the automated teller machine 800 from their vehicle. In other words, in some cases, the automated teller machine 800 may be considered a drive-thru automated teller machine. Notably, it may be desirable to allow customers to avoid the need to provide a second authentication factor such as, for example, a PIN when they are using a drive-thru ATM in order to avoid the need to reach out a vehicle window such as to provide input to the ATM. Conveniently, a single-authentication factor withdrawal using the automated teller machine may avoid the need to provide such input, especially where a pre-determined withdrawal amount is employed.

Figure 9B:
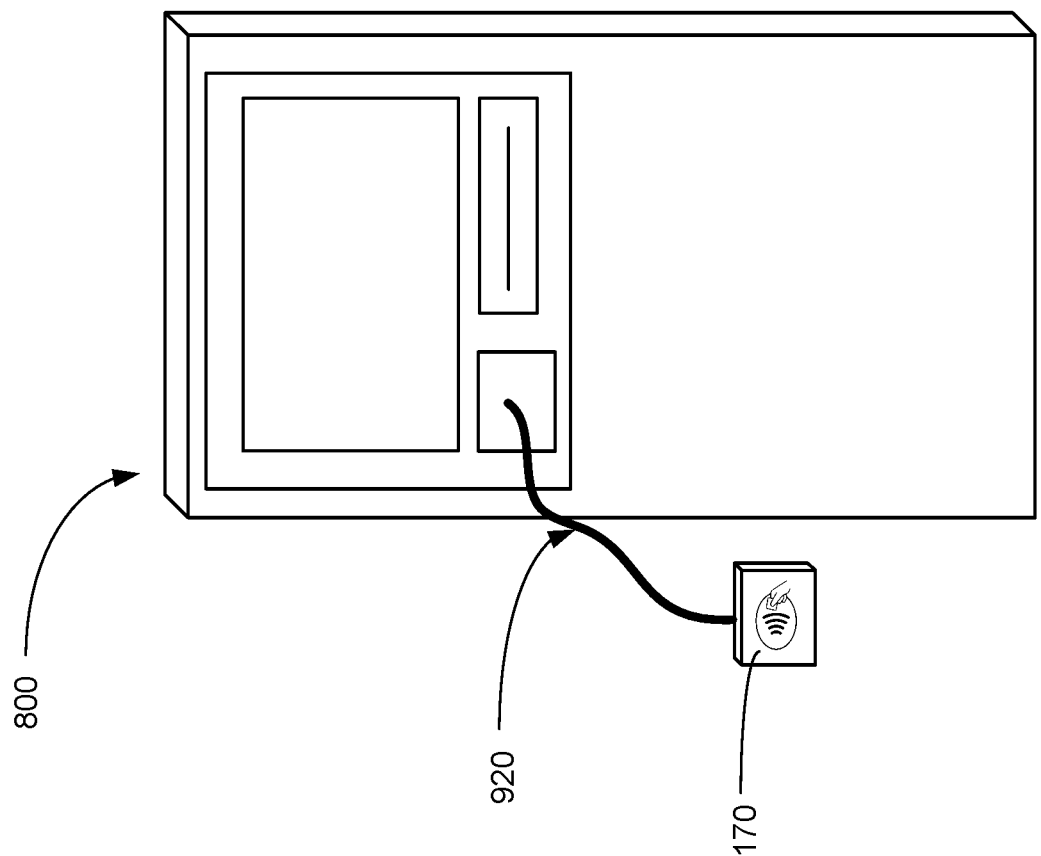
FIGS. 9A and 9B show variants of the automated teller machine of FIG. 8 in which a wireless communication module is separable from the body of the automated teller machine.
Figure 9A:
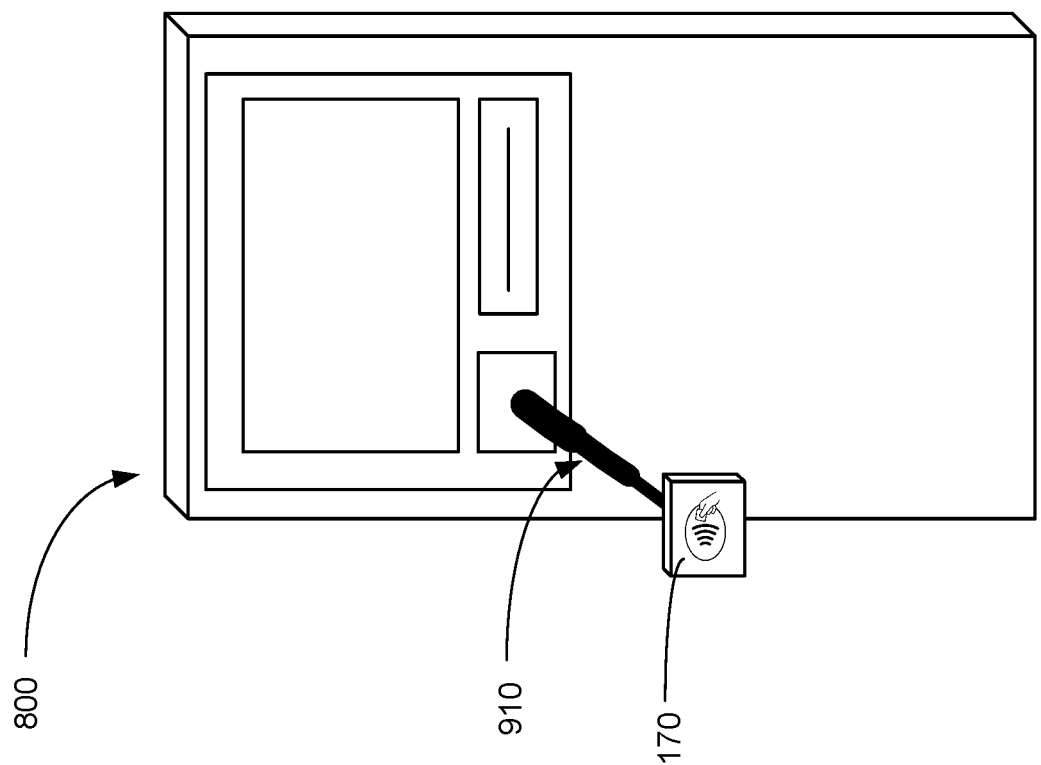

Variations of the automated teller machine 800 (or, more generally, the automated teller machine 100) may be particularly suited for drive-thru applications. FIGS. 9A and 9B show variants of the automated teller machine 800 in which the wireless token reader 170 is separable from the body of the automated teller machine 800. In particular, the wireless token reader 170 is disposed in a separate component linked to the body of the automated teller machine 800, with that component configured to allow displacement of that component away from the body of the automated teller machine towards a customer such as, for example, towards a vehicle visiting the drive-thru automated teller machine.

As shown in FIG. 9A, the linkage between the wireless communication module (the wireless token reader 170) involves a telescoping member 910. The telescoping member 910 allows the wireless token reader 170 to be extended away from the automated teller machine 800. In some embodiments, it may be that the telescoping member 910 includes a retraction mechanism (e.g., using a loaded spring) that will automatically draw the wireless token reader 170 back towards the automated teller machine 800 when released by a user (e.g., after they finish using it to read their authentication token). In some embodiments, the telescoping member 910 may also include a pivoting link (e.g., a universal joint) to allow the wireless token reader 170 to be pivoted relative to the body of the automated teller machine 800. The wireless token reader 170 may be connected to the body of the automated teller machine 800 proper by way of an electrical link included in the telescoping member 910 for communicating power and/or signals therebetween. Additionally or alternatively, the wireless token reader 170 may communicate wirelessly with the automated teller machine 800 such as, for example, by a local wireless technology such as, for example, using Bluetooth™.

In another example of a linkage between the wireless token reader 170 and the body of the automated teller machine 800, it may be that, as illustrated in FIG. 9B, the wireless token reader 170 is linked to the body of the automated teller machine 800 by way of an electrical cable 920 that serves as an electrical umbilical cord and may communicate power and/or signals between the wireless token reader 170 and the automated teller machine 800 proper. Also akin to the telescoping member 910, the electrical cable 920 may be retractable.

Other linkages are also contemplated, for example, a link could include a telescoping member and an electrical cable extending therefrom.

Figure 10:
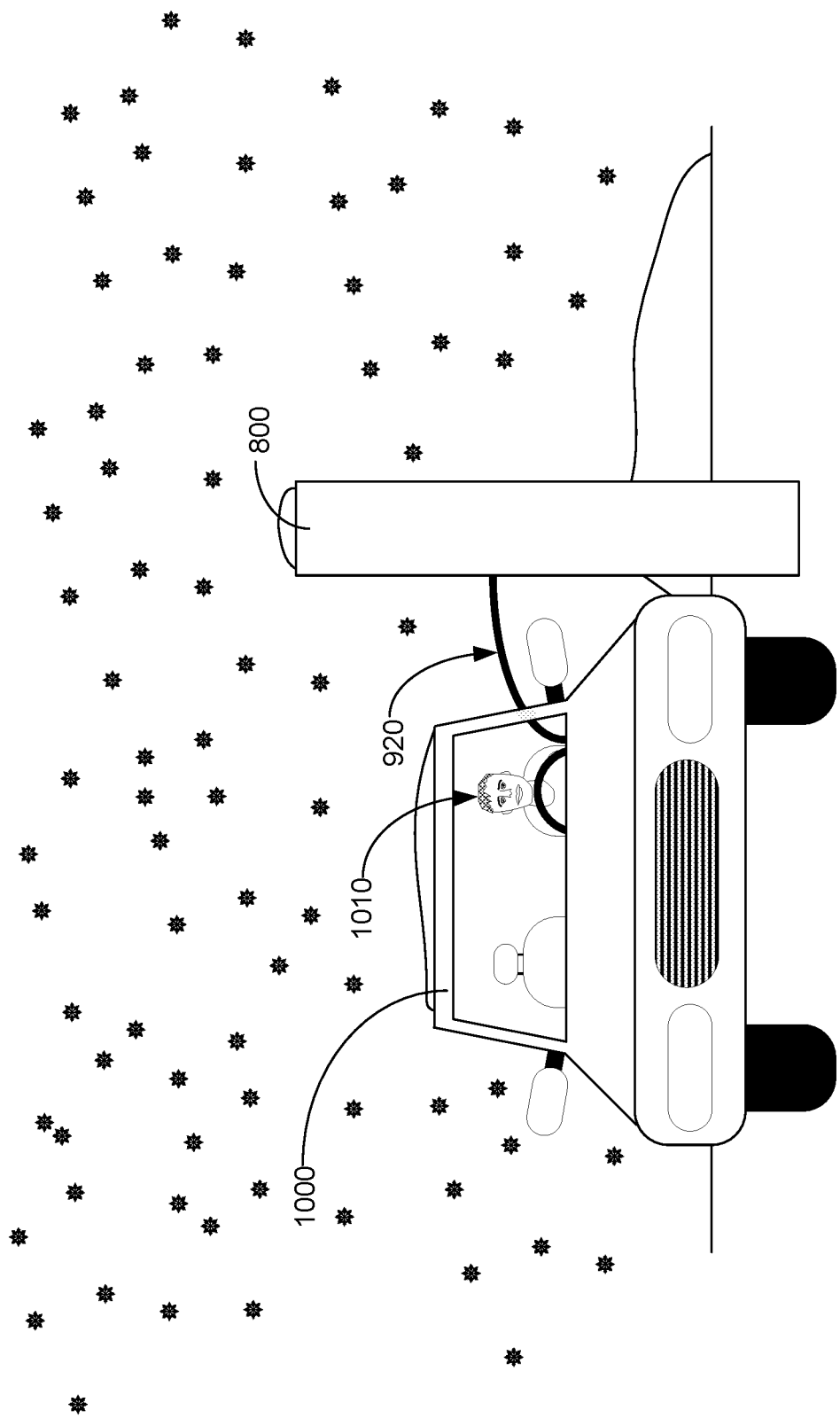
FIG. 10 shows an example use case of variants of the automated teller machine of FIG. 8 in which a wireless communication module is separable from the body of the automated teller machine.

An example use case of a variation of the automated teller machine 800 having a separate wireless communication module is shown in FIG. 10. The example use case illustrated in FIG. 10 involves a drive-thru. In particular, FIG. 10 shows a situation where a vehicle 1000 has pulled up beside the automated teller machine 800. An operator 1010 of the vehicle 1000 has displaced the wireless token reader 170 away from the body of the automated teller machine 800 and into the interior of the vehicle, with the electrical cable 920 extending through a window of the vehicle. Such a scenario may be particular desirable where, as shown, the drive-thru is located outside in winter weather. Conveniently, where the automated teller machine 800 is so employed a user may only need to reach outside the vehicle in order to access the wireless token reader 170 and in order to receive the value instruments dispensed to satisfy their withdrawal.

Notably, with a conventional drive-thru ATM, a user may have to reach into the weather in order to key a PIN and/or provide input selecting a withdrawal amount. Further, because this may require some dexterity in order to use a keypad and/or bare skin in order to drive a touchscreen, the user may not be able to wear gloves when so reaching out into frigid conditions. Furthermore, neither operation may be possible while wearing mittens. By contrast, because the user of the automated teller machine 800 does not need to key such input, the user may be able to avoid having to reach into the cold without gloves, with both the retrieval of the wireless token reader 170 and the dispensed value instruments being low-dexterity activities that the user can readily perform while wearing gloves or even mittens.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:
1. An automated teller machine comprising:
a processor;
a wireless communications module coupled to the processor;
a value instrument dispenser coupled to the processor; and a memory coupled to the processor and storing instructions that, when executed by the processor, cause the automated teller machine to:

detect, using the wireless communications module, that an authentication token capable of wireless communication has been brought into communications range of the wireless communications module;

communicate with the authentication token using the wireless communication module to cryptographically authenticate the token and to receive information identifying an account associated with the token; and without receiving user-input providing a second authentication factor:

initiate processing of a withdrawal of a specified quantity of value instruments from the account, wherein processing the withdrawal includes determining, based on an automated assessment of compliance with one or more policies, that the withdrawal is executable without further authentication, and dispense, using the value instrument dispenser, the specified quantity of value instruments.

2. The automated teller machine of claim 1, wherein the automated teller machine is a drive-thru automated teller machine.

3. The automated teller machine of claim 2, wherein the wireless communication module is disposed in a component of the drive-thru automated teller machine linked to a body of the drive-thru automated teller machine, the component configured to allow displacement thereof away from the body of the drive-thru automated teller machine towards a vehicle visiting the drive-thru automated teller machine.

4. The automated teller machine of claim 1, where the instructions, when executed by the processor, further cause the automated teller machine to:

detect, using the wireless communications module, that a second authentication token capable of wireless communication has been brought into communications range of the wireless communications module;

communicate with the second authentication token using the wireless communication module to cryptographically authenticate the second token and to receive information identifying a second account associated with the second token;

determine, based on an automated assessment of compliance with one or more policies, that a second withdrawal of a specified quantity of value instruments from the second account requires further authentication; and provide an indication requesting provision of another authentication factor.

5. The automated teller machine of claim 1, further comprising an input device coupled to the processor, wherein the instructions, when executed by the processor, further cause the automated teller machine to receive, using the input device, an identification of the specified quantity of value instruments.

6. The automated teller machine of claim 1, wherein the specified quantity of value instruments is a pre-defined amount associated with at least one of the token and the account.

7. The automated teller machine of claim 1, wherein determining, based on the automated assessment of compliance with the one or more policies, that the withdrawal is executable without further authentication includes determining that completing the withdrawal would not exceed a limit on withdrawals from the account without use of the second authentication factor.

8. The automated teller machine of claim 1, wherein the token includes a payment card.

9. The automated teller machine of claim 1, wherein the automated teller machine does not include a contact card reader.

10. The automated teller machine of claim 1, wherein the second authentication factor includes a personal identification number (PIN).

11. The automated teller machine of claim 1, wherein the automated teller machine is a withdrawal-only automated teller machine.

12. A method of processing a withdrawal of value instruments comprising:

detecting that an authentication token capable of wireless communication has been brought into communications range of an automated teller machine;

communicating, by the automated teller machine, wirelessly with the authentication token to cryptographically authenticate the token and to receive information identifying an account associated with the authentication token; and without receiving, by the automated teller machine, user-input providing a second authentication factor:

initiating, by the automated teller machine, processing of a withdrawal of a specified quantity of value instruments from the account, wherein processing the withdrawal includes determining, based on an automated assessment of compliance with one or more policies, that the withdrawal is executable without further authentication, and dispensing, by the automated teller machine, the specified quantity of value instruments.

13. The method of claim 12 further comprising:

detecting that a second authentication token capable of wireless communication has been brought into communications range of the automated teller machine;

communicating with the second authentication token to cryptographically authenticate the second token and to receive information identifying a second account associated with the second token;

determining, based on an automated assessment of compliance with one or more policies, that a second withdrawal of a specified quantity of value instruments from the second account requires further authentication; and providing an indication requesting provision of another authentication factor.

14. The method of claim 12 further comprising receiving, by the automated teller machine, an identification of the specified quantity of value instruments.

15. The method of claim 12, wherein the specified quantity of value instruments is a pre-defined amount associated with at least one of the authentication token and the account.

16. The method of claim 12, wherein determining, based on the automated assessment of compliance with the one or more policies, that the withdrawal is executable without further authentication includes determining that completing the withdrawal would exceed a limit on withdrawals from the account without use of the second authentication factor.

17. The method of claim 12, wherein the authentication token includes a payment card.

18. The method of claim 12, wherein the automated teller machine is operating in an offline mode wherein withdrawals are processed without communicating with an automated teller machine network.

19. The method of claim 12, wherein communicating, by the automated teller machine, wirelessly with the authentication token to authenticate the authentication token includes the automated teller machine acting as a relay for communications between the authentication token and a remote authentication server.

20. The method of claim 12, wherein the second authentication factor includes a personal identification number (PIN).

\* \* \* \* \*